United States Patent Office 3,316,753
Patented May 2, 1967

3,316,753
ELECTRO-HYDRAULIC PRESSURE DIFFERENTIAL TESTER
James Le Roy Herren, Decatur, Ala., assignor to Calumet & Hecla, Inc., Allen Park, Mich., a corporation of Michigan
Filed Oct. 7, 1963, Ser. No. 314,450
11 Claims. (Cl. 73—49.1)

The invention relates to testing apparatus and refers more specifically to a pressure differential tester of the type used to test for a leak in one of a plurality of tubes including a manometer and capacitive means for automatically sensing the presence of a leak in one of the tubes and mechanism for automatically marking the tube having the leak therein and a method of use of the tester.

In past pressure differential testers of the type wherein a predetermined pressure is connected to opposite legs of a manometer tube and to tubes to be tested and the pressure differential between the legs of the manometer tube after a predetermined time is used as an indication of a leak in one of the tubes tested, the pressure differential has been visually determined by observing, for example, the height of the fluid in the manometer tube legs. Also, it has in the past been necessary to manually mark the leaking tube.

The manual recognition or sensing of a leak in a tube and consequent manual marking of the tube is objectionable in that it provides room for human error. Also, such manual operations are not in accordance with the modern trend toward mass production of finned tubes and the like.

Similarly the separate individual testing of tubes for leaks or even the testing of pairs of tubes for leaks is not in accordance with mass production techniques. This is especially true when a very small percentage of tubes tested are defective.

It is therefore an object of the present invention to provide an improved pressure differential tester.

Another object is to provide a pressure differential tube tester including means for automatically sensing a leak in one of a plurality of tubes being tested.

Another object is to provide an improved method of use of a pressure differential tube tester for sensing a leak in one of a plurality of tubes being tested.

Another object is to provide a pressure differential tube tester including means for automatically sensing a leak in one of a plurality of tubes being tested and means for automatically marking the tube having the leak therein.

Another object is to provide a pressure differential tester as set forth above wherein the means for automatically sensing a leak includes a manometer connected between the tubes to be tested and capacitive means operably associated with the manometer for sensing a difference of water level in the manometer produced by a pressure difference between the legs of the manometer tube.

Another object is to provide a method of use of a pressure differential tube tester as set forth above wherein a plurality of tubes can be connected to each leg of the manometer comprising, noting which leg of the manometer an indicated defective tube is connected to and disconnecting the tubes from the noted leg one at a time and rerunning the test after each tube is disconnected until a test indicates no defective tube being tested.

Another object is to provide a method of use of a pressure differential tube tester as set forth above wherein a plurality of tubes can be connected to each leg of the manometer comprising, noting which leg of the manometer an indicated defective tube is connected to and reversing the leg of the manometer to which single tubes are connected and rerunning the test until the defective tube is noted to be connected to the other leg of the manometer.

Another object is to provide a pressure differential tester and method of use thereof which is simple, economical and efficient.

Other objects and features of the invention will become apparent as the description proceeds, especially when taken in conjunction with the accompanying drawings, illustrating a preferred embodiment of the invention, wherein.

Figure 1:
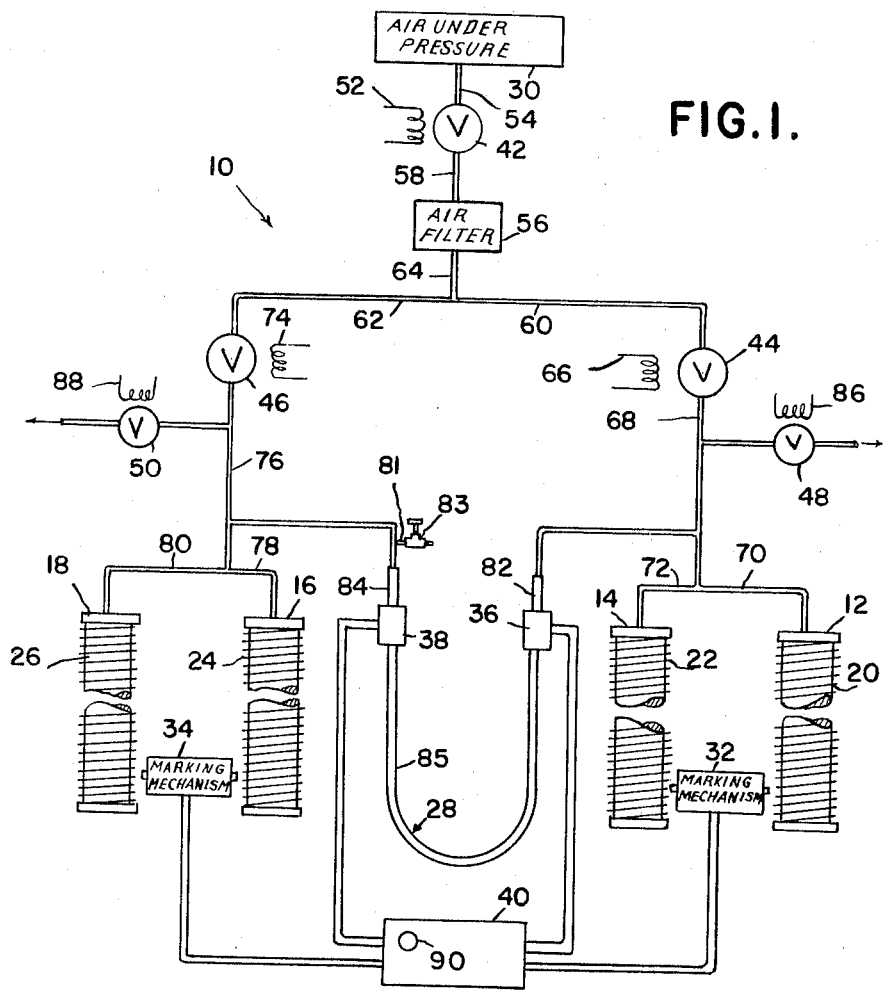
FIGURE 1 is a diagrammatic representation of a pressure differential tester for testing for leaks in finned tubes constructed in accordance with the invention.

With particular reference to the figures of the drawing, one embodiment of the present invention will now be considered in detail.

As illustrated in FIGURE 1, the pressure differential tube tester 10 includes separate mounting structure 12, 14, 16 and 18 in which finned tubes 20, 22, 24 and 26, respectively, are mounted, a manometer 28, a source of air under pressure 30, marking mechanism 32 associated with tubes 20 and 22, marking mechanism 34 associated with tubes 24 and 26, sensing capacitors 36 and 38, control circuit 40 for sequencing the operation of the pneumatic valves 42, 44, 46, 48 and 50 and the marking mechanisms 32 and 34 and the connecting pneumatic conduits and electrical conductors.

In operation, after air at a predetermined pressure is provided in tubes 20, 22, 24 and 26 to produce a predetermined equal water level in both legs 82 and 84 of the manometer 28, any variation therein due to a leak in one of the tubes is sensed by the capacitors 36 and 38. The signal sensed by capacitors 36 and 38 representative of a leak in a tube causes one of the marking devices 32 and 34 to mark the tubes associated therewith.

More specifically the source of air under pressure 30 may be a conventional industrial regulated air supply. For example, the air supply from the source of air under pressure 30 may be regulated at two hundred fifty pounds per square inch.

The solenoid operated valve 42 is normally closed and is actuated on the solenoid 52 being energized to pass air under pressure from the source of air 30 received through conduit 54 to air filter 56 through conduit 58. The air at the regulated pressure passing through filter 56 is fed into the separate conduits 60 and 62 over conduit 64.

The air passing into conduit 60 is fed to the solenoid operated valve 44. The solenoid operated valve 44 is normally closed and is opened on the solenoid 66 being energized. Opening of the solenoid operated valve 44 permits the air to pass through conduits 68, 70 and 72 into the tubes 20 and 22, respectively, through the mounting apparatus 12 and 14 therefor. Similarly the air passed from conduit 64 into conduit 62 is fed to the solenoid operated valve 46. The valve 46 is again normally closed and is opened only on the solenoid 74 being energized. On opening of the valve 46, air is passed through conduit 76, and conduits 78 and 80 to the tubes 24 and 26 through the mounting apparatus 16 and 18 therefor, respectively.

The air in conduit 68 is also fed to the upper end of the leg 82 of the U-shaped tube 85 of the manometer 28 while the air in the conduit 76 is fed to the upper end of the other leg 84 of the manometer tube 85. Thus with the same air pressure in the conduits 68 and 76 on opening of valves 44 and 46 the pressure on the water in the legs 82 and 84 of the manometer 28 will be exactly equal to maintain the water level in the two legs exactly equal. Conduit 81 and manual valve 83 are provided to permit filling the manometer tube to a predetermined level with water or other fluid.

The solenoid operated exhaust valve 48 is normally open and is closed only on energizing the solenoid 86. Similarly the solenoid operated exhaust valve 50 is normally open and is closed only on energizing the solenoid 88. When the exhaust valves 48 and 50 are open, the tubes 20, 22, 24 and 26, as well as the ends of legs 82 and 84 of the manometer tube 85 are open to atmospheric or exhaust pressure.

The marking mechanisms 32 and 34 may be any of a plurality of well known devices operable to provide a mark on members, such as the finned tubes 20 and 22 and 24 and 26, on receipt of an electrical impulse. Since a number of such devices are available and in fact may take the form of simple solenoid operated plungers having marking means on the outer ends thereof, the detailed construction of the marking mechanisms 32 and 34 will not be considered herein.

The tube mounting structures 12, 14, 16 and 18 should be capable of holding a tube securely with both ends sealed except for an air connection to the respective air conduits 70, 72, 78 and 80. The tube mounting structures 12, 14, 16 and 18 are well known and the details thereof will not be considered herein.

Figure 2:
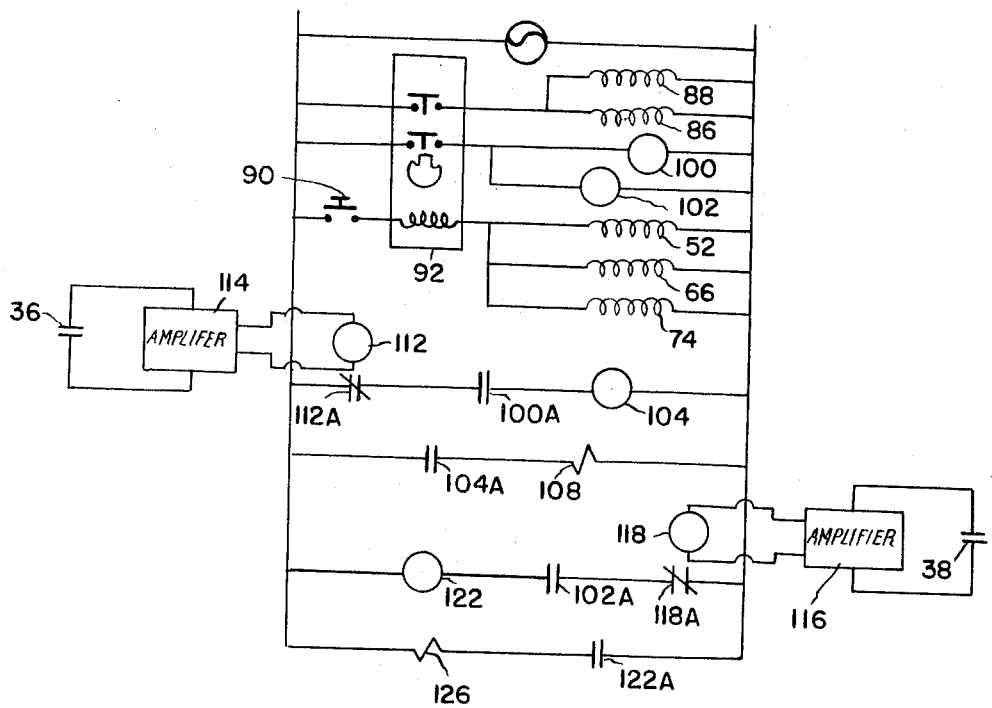
FIGURE 2 is a schematic diagram of the control circuit for the pressure differential tube tester illustrated in FIGURE 1.

The capacitive sensing apparatus 36 and 38 may be for example a Model B–O4D produced by Electr-O-Probe Instruments, Inc. Such sensing devices are well known and may in fact be a simple capacitor having the plates positioned on opposite sides of the manometer tube. The capacitors may be curved to conform to the manometer tube and are connected to an amplifier having a relay actuating coil in the output thereof, as illustrated in FIGURE 2. The exact structure of the sensing devices 36 and 38 will not be considered herein.

The operation of the pressure differential tube tester 10 will be considered in conjunction with the schematic diagram of the electrical control circuit 40 illustrated in FIGURE 2.

When it is desired to test tubes 20, 22, 24 and 26, the tubes are secured in the mounting apparatus 12, 14, 16 and 18 with the ends of the tubes sealed tight and the tubes connected to the respective conduits 70, 72, 78 and 80.

With the tubes so connected the push-button 90 is pressed to energize the solenoid coils 52, 66 and 74 through the timer 92 to open the normally closed valves 42, 46 and 44 and provide air at a regulated pressure in the tubes 20, 22, 24 and 26 as well as ends 82 and 84 of the manometer tube 85 which has been filled through conduit 81 and valve 83 to provide a water level under equal pressure in the legs 82 and 84 at the top of the sensing capacitors 36 and 38 secured thereto. The solenoids 52, 66 and 74 will remain energized as long as the push-button 90 is pressed.

At this time the exhaust valves 48 and 50 which are normally open are closed by the energizing of the timer 92. The timer 92 is such that after a predetermined period of time after the push-button 90 is released, for example ten seconds, the timer 92 will time out and the exhaust valves 48 and 50 will return to their normally open condition on deenergizing of solenoids 86 and 88.

In addition, in accordance with the invention, the timer 92 after a shorter time, for example five seconds after the push-button 90 is released, will energize the relay actuating coils 100 and 102 to cause the contacts 100A and 102A to close. Contacts 100A and 102A will then remain closed until the timer times out at which time the contacts 100A and 102A will open.

Contact 100A is provided to energize the relay actuating coil 104 which closes the contacts 104A to energize solenoid 108 if the contacts 112A are closed during the period immediately preceding the timing out of the timer 92. Contacts 112A will be closed only if the actuating coil 112 therefor is not energized. Coil 112 will be energized if the capacitive sensing means 36 senses the water in the manometer tube leg 82 to be low indicating a leak in one of the tubes 24 and 26. The leak is sensed by the capacitive sensing means 36 which provides a signal to amplifier 114 sufficient on amplification to energize the coil 112. On the solenoid 108 being energized the marking mechanism 34 is caused to mark the tubes 24 and 26.

A similar chain of events takes place when one of the tubes 20 and 22 leaks to provide a low water level in the leg 84 of the manometer tube 85 as sensed by the capacitive sensing means 38. That is to say, the signal provided by the capacitive sensing means 38 is amplified in amplifier 116 and is used to energize coil 118 so that the contacts 118A are closed during, for example a five second period when the contacts 102A are closed, which five second period is determined by the timer 92 energizing coil 102. As before, when the contacts 102A and 118A are simultaneously closed, the coil 122 is energized to close the contacts 122A and energize solenoid 126 which causes marking mechanism 32 to mark the tubes 20 and 22.

As indicated above there is no means provided to determine which of the two tubes 20 and 22 in a given pressure differential tester as disclosed is defective. However, after a bad tube has been indicated connected to one leg or the other of the manometer tube 85, the tubes connected to the one leg of the manometer tube may be separately removed and the test rerun with the remaining tubes until a test indicates that no defective tube remains connected to the manometer since the tube mounting structures adjacent each leg of the manometer tube may be separately closed if desired.

In addition, it is pointed out that in the manufacture of finned tubes and the like the percentage of defective tubes is so small as to make the possibility of two of the tubes in any one test defective substantially non-existent. This fact gives rise to the possibility of merely exchanging two of the tubes, for example 22 and 24, and rerunning the test to provide an accurate indication of the tube which is defective.

While one embodiment of the present invention and modifications thereof have been disclosed in detail, it will be readily understood that other embodiments and modifications are contemplated. It is the intention to include all embodiments and modifications of the invention as are defined by the appended claims within the scope of the invention.

What I claim as my invention is:

1. A pressure differential tube tester for testing for leaks in a plurality of tubes comprising a manometer including a U-shaped tube having fluid therein, means for mounting a plurality of tubes adjacent each leg of the manometer tube and connected to the respective leg of the manometer tube, a source of air under pressure, means for connecting the legs of the manometer tube and the tubes connected thereto to the source of air so that no pressure differential exists between the legs of the manometer tube, means for subsequently disconnecting the manometer and tubes from the source of air under pressure, means for automatically sensing a pressure differential between the legs of the manometer tube after the manometer tube and tubes have been disconnected from the source of air under pressure as an indication of a defect in one of the tubes connected to the manometer tube and means for subsequently exhausting the air from the manometer and tubes.

2. Structure as set forth in claim 1 wherein the means for sensing a pressure differential between the legs of the manometer tube comprises a pair of capacitors having plates positioned on opposite sides of the respective legs of the manometer tube at the level of the fluid therein with no pressure differential between the legs of the manometer tubes.

3. Structure as set forth in claim 1 and further including means connected to the sensing means and responsive thereto for marking a defective tube connected to the manometer tube.

4. Structure as set forth in claim 3 and further including means for preventing marking of a defective tube for a predetermined time after disconnecting the manometer tube from the source of air under pressure.

5. In combination with a pressure differential tube tester for testing a plurality of tubes simultaneously, means for automatically sensing a leak in one of the tubes and means for automatically marking the tube having the leak therein.

6. The method of testing tubes with a pressure differential tube tester including a manometer, means for connecting a plurality of tubes to each leg of the manometer and to a source of air under pressure, means for disconnecting the source of air under pressure from the manometer and tubes and means for subsequently exhausting the air under pressure from the manometer and tubes comprising sensing the pressure differential in the manometer after disconnecting a source of air under pressure therefrom to determine which leg of the manometer a defective tube is connected to and subsequently interchanging single tubes connected to opposite legs of the manometer and retesting the tubes with the tester until the leaking tube is indicated to be connected to the opposite leg of the manometer if a pressure differential is sensed during the initial test.

7. The method of testing tubes with a pressure differential tube tester including a manometer, means for connecting a plurality of tubes to each leg of the manometer and to a source of air under pressure, means for disconnecting the source of air under pressure from the manometer and tubes and means for subsequently exhausting the air under pressure from the manometer and tubes comprising sensing the pressure differential in the manometer after disconnecting a source of air under pressure therefrom to determine which one leg of the manometer a defective tube is connected to and subsequently removing single tubes connected to the one leg of the manometer and closing the connection thereof to the manometer leg, retesting the remaining tubes with the tester and repeating the removal of a single tube and retesting until no pressure differential is sensed across the manometer if a pressure differential is sensed during the intial test.

8. A pressure differential tester for testing for leaks in a plurality of hollow members comprising a manometer including a U-shaped tube having fluid therein, means for mounting a plurality of hollow members adjacent each leg of the manometer tube and connected to the respective leg of the manometer tube, a source of air under pressure, means for connecting the legs of the manometer tube and the hollow members connected thereto to the source of air so that no pressure differential exists between the legs of the manometer tube, means for subsequently disconnecting the manometer tube and hollow members from the source of air under pressure and means for sensing a pressure differential between the legs of the manometer tube after the manometer tube and hollow members have been disconnected from the source of air under pressure as an indication of a defect in one of the hollow members connected to the manometer tube.

9. A pressure differential tester for testing for leaks in a plurality of containers comprising a pressure differential meter having differential pressure sides, means for mounting a plurality of containers adjacent each side of the pressure differential meter and connected to the respective side of the pressure differential meter, a source of air under pressure, means for connecting the opposite sides of the pressure differential meter and the containers connected thereto the source of air so that no pressure differential exists between the sides of the pressure differential meter, means for subsequently disconnecting the pressure differential meter and containers from the source of air under pressure and means for sensing a pressure differential between the sides of the pressure differential meter after the pressure differential meter and containers have been disconnected from the source of air under pressure as an indication of a defect in one of the containers connected to the pressure differential meter.

10. Structure as set forth in claim 9 and further including means connected to the sensing means and responsive thereto for marking a defective container connected to the pressure differential meter.

11. Structure as set forth in claim 10 and further including means for preventing marking of a defective container for a predetermined time after disconnecting the pressure differential meter from the source of air under pressure.

References Cited by the Examiner

UNITED STATES PATENTS

| 2,743,604 | 5/1956 | Stein et al. | 73—49.4 |
| 2,746,295 | 5/1956 | Lubkin | 73—398 |
| 3,028,750 | 4/1962 | Rondeau | 73—49.2 |

FOREIGN PATENTS

| 917,111 | 1/1963 | Great Britain. |

LOUIS R. PRINCE, *Primary Examiner.*

S. C. SWISHER, *Assistant Examiner.*